United States Patent [19]

Sellers

[11] Patent Number: 5,775,139
[45] Date of Patent: Jul. 7, 1998

[54] TRAILER HITCH LOCK

[76] Inventor: Fred J. Sellers, 1109 Roswell Rd., Knoxville, Tenn. 37923

[21] Appl. No.: 872,027

[22] Filed: Jun. 10, 1997

[51] Int. Cl.⁶ .................................................. B60D 1/60
[52] U.S. Cl. .................. 70/14; 70/58; 70/164; 70/232; 70/258; 280/507
[58] Field of Search .................. 70/14, 57, 58, 70/163, 164, 167, 168, 158–161, 232, 237, 258; 280/507

[56] References Cited

U.S. PATENT DOCUMENTS

| | | | |
|---|---|---|---|
| 3,526,110 | 9/1970 | Foote | 70/58 |
| 3,605,457 | 9/1971 | Foster | 70/58 |
| 3,810,664 | 5/1974 | Nunnick, Jr. et al. | 280/507 |
| 4,774,823 | 10/1988 | Callison | 70/14 |
| 4,925,205 | 5/1990 | Villalon et al. | 280/507 |
| 5,087,064 | 2/1992 | Guhlin | 280/507 |
| 5,222,755 | 6/1993 | O'Neal | 280/507 |
| 5,421,601 | 6/1995 | Hinze et al. | 280/507 |
| 5,433,468 | 7/1995 | Dixon | 280/507 |
| 5,476,281 | 12/1995 | Worthington | 280/507 |

*Primary Examiner*—Lloyd A. Gall
*Attorney, Agent, or Firm*—Pitts & Brittian, P.C.

[57] ABSTRACT

A trailer hitch lock for enclosing a trailer hitch to secure the trailer against theft. The trailer hitch lock includes a base plate, a set of locking plates pivotably mounted to opposing sides of the base plate and a locking mechanism for securing the locking plates together. A mounting ball is mounted on the base plate and is configured to engage the trailer hitch ball socket. The first ends of the locking plates are hingeably connected to the opposing sides of the base plate. The second ends of the locking plates and the locking mechanism cooperate to secure the locking plates together.

5 Claims, 2 Drawing Sheets

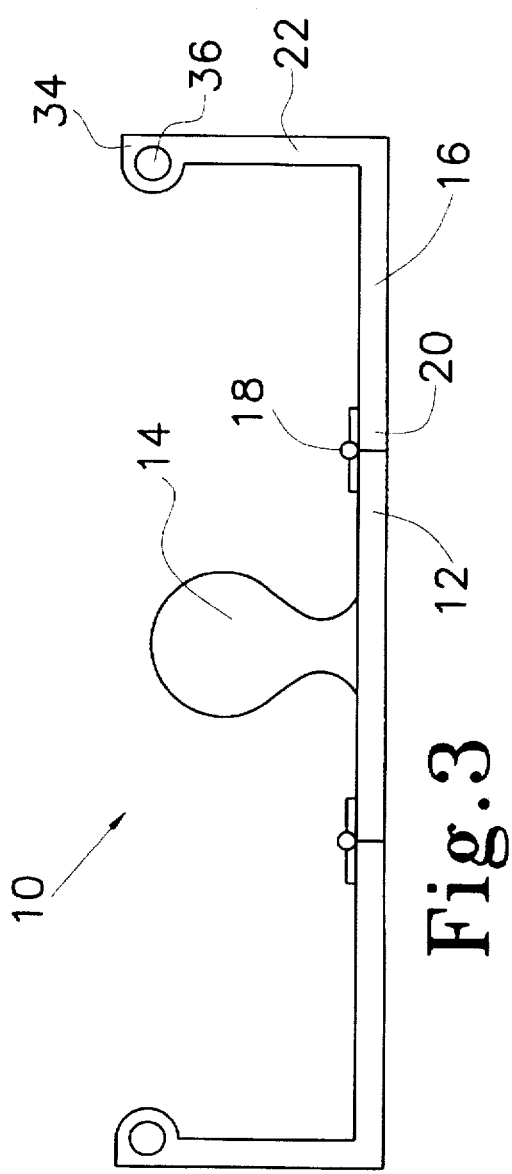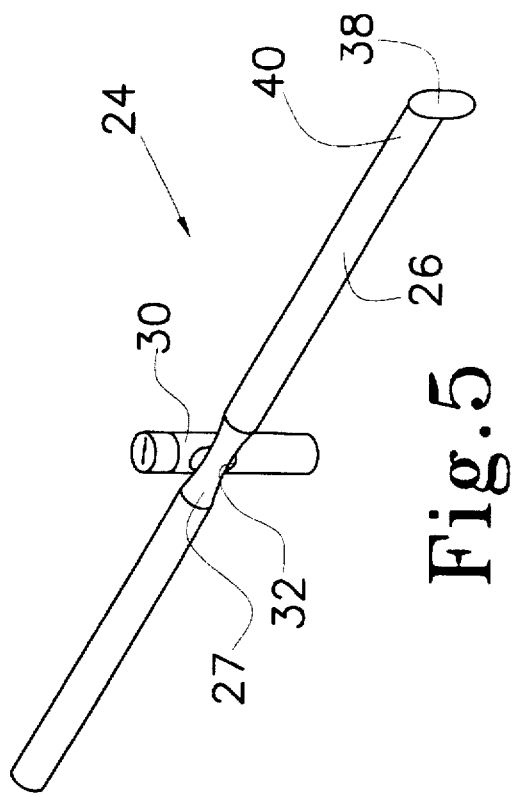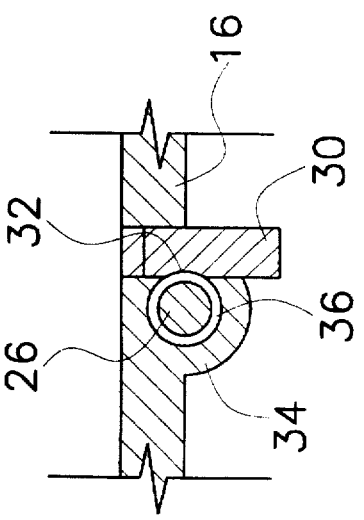

TRAILER HITCH LOCK

TECHNICAL FIELD

This invention relates to the field of trailer hitch or trailer tongue locks.

BACKGROUND ART

Many types of trailers are constructed with an integral trailer hitch for releasably securing the trailer to a vehicle such that the trailer is towable behind the vehicle. It is common practice to disengage the trailer from the vehicle and leave it unattended in a publicly accessible location. The trailer is vulnerable to being stolen simply by connecting a towing vehicle to the trailer hitch of the trailer and leaving.

Several devices have been developed to prevent trailer theft by preventing the connection of a towing vehicle to the trailer ball socket. Typical of the art are those devices disclosed in the following U.S. Patents:

| U.S. Pat. No. | Inventor(s) | Issue Date |
| --- | --- | --- |
| 3,526,110 | D. J. Foote | September 1, 1970 |
| 3,605,457 | W. D. Foster | September 20, 1971 |
| 3,810,664 | Nunnick, Jr. et al. | May 14, 1974 |
| 4,774,823 | D. A. Callison | October 4, 1988 |
| 4,925,205 | Villalon et al. | May 15, 1990 |
| 5,087,064 | K. G. Guhlin | February 11, 1992 |
| 5,222,755 | G. L. O'Neal | June 29, 1993 |
| 5,433,468 | J. S. Dixon | July 18, 1995 |
| 5,476,281 | G. Worthington | December 19, 1995 |

The device disclosed in the '457 patent teaches a trailer hitch lock which is generally an open ended rectangular box formed to enclose the end portion of a trailer hitch. A substitute towing ball is mounted in the rectangular box for engagement in the ball socket of the trailer hitch. The box is secured with a complicated locking mechanism which is vulnerable to being pried apart.

Therefore, it is an object of the present invention to provide a trailer hitch lock configured to enclose the end of the trailer hitch.

It is another object of the present invention to provide a trailer hitch lock which includes a secure locking mechanism.

SUMMARY

Other objects and advantages will be accomplished by the present invention which teaches a trailer hitch lock for securing a trailer hitch to protect against theft. The trailer hitch lock of the present invention includes a base plate, a set of locking plates pivotably mounted to opposing sides of the base plate and a locking mechanism for securing the locking plates together. A mounting ball is mounted on the base plate and is configured to engage the trailer hitch ball socket. The first ends of the locking plates are hingeably connected to the opposing sides of the base plate. The second ends of the locking plates and the locking mechanism cooperate to secure the locking plates together.

BRIEF DESCRIPTION OF THE DRAWINGS

The above mentioned features of the invention will become more clearly understood from the following detailed description of the invention read together with the drawings in which:

FIG. 3 illustrates a side view of the trailer hitch lock in an open position;

FIG. 4 illustrates a sectional view of the trailer hitch taken along line 4—4 of FIG. 1;

FIG. 5 illustrates the locking pin and lock.

DESCRIPTION OF PREFERRED EMBODIMENTS

A trailer hitch lock incorporating various features of the present invention is illustrated generally at 10 in the figures. The trailer hitch lock 10 is configured to surround the end portion of a trailer hitch and includes a secure locking mechanism.

Figure 1:
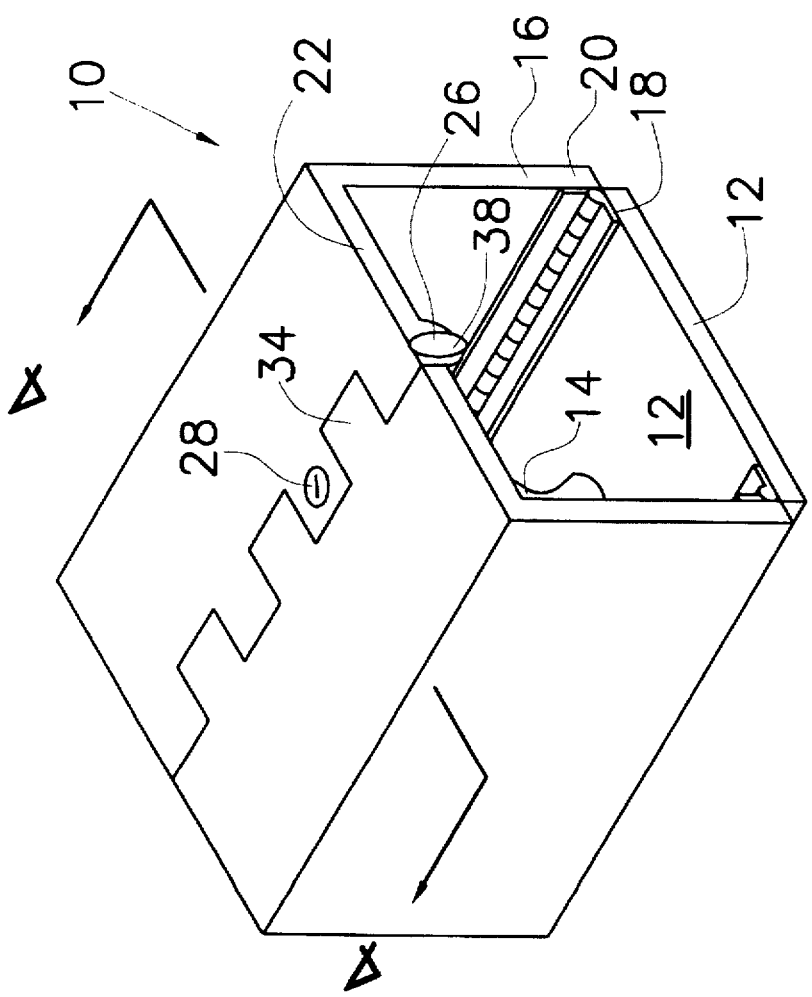
FIG. 1 is a perspective view of the trailer hitch lock of the present invention.

The trailer hitch lock 10 is generally comprised of a base plate 12, two locking plates 16 pivotably secured to the base plate 12 and a locking mechanism 24 which secures the locking plates 16 together, as shown in FIG. 1. A mounting ball 14 is welded to the base plate 12, as shown in the Figures. In the preferred embodiment, the mounting ball 14 is centrally located on the base plate 12, and the base plate 12, the locking plates 16 and the mounting ball 14 are fabricated from steel.

Figure 2:
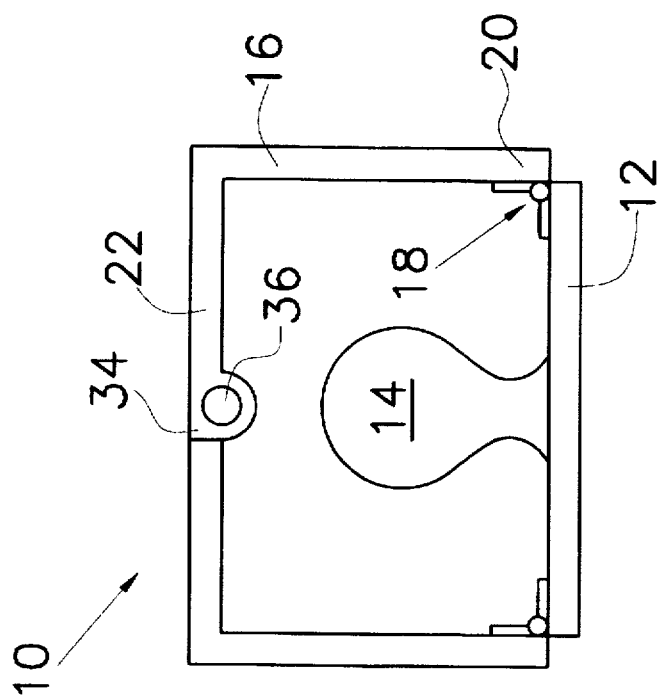
FIG. 2 illustrates a side view of the trailer hitch lock in a closed position.

Each locking plate 16 defines a first end 20 and a second end 22. The first end 20 of each locking plate 16 is pivotably mounted to opposing ends of the base plate 12, as shown in FIGS. 2 and 3. In the preferred embodiment, each locking plate 16 is hingeably connected to the base plate 12 via a hinge 18 welded to the base plate 12 and the locking plate 16. Preferably, the ends of each hinge 18 are plugged to prevent filing. It will be noted that although the locking plates 16 form right angles in the Figures any configuration would be suitable such as circular or flat. The interior of the hitch lock 10 must be sufficient to enclose the trailer hitch to be secured.

The second ends 22 of the locking plates 16 cooperate with each other and the locking mechanism 24 to secure the the second ends 22 together. In the preferred embodiment, each locking plate 16 defines a series of spaced extensions 34 which extend from the second end 22 of each locking plate 16, as shown in FIG. 1. The extensions 34 of one locking plate 16 are positioned such that they mesh with the extensions 34 of the remaining locking plate 16. Each of the extensions 34 defines a cylindrical opening 36 therethrough. The cylindrical openings 36 align when the second ends 22 of the locking plates 16 are brought together.

In the preferred embodiment, the locking mechanism 24 is a conventional cylinder lock which includes a lock 28 and a locking pin 26, as shown in FIGS. 4 and 5. The lock 28 is mounted proximate an extension 34 and includes a notched cylinder 30 which is axially rotatable. Preferably, the lock 28 is key activated to control the rotation of the notched cylinder 30. The notched cylinder 30 extends downward through a portion of the cylindrical opening 36 defined by the extension 34 proximate to which the lock 28 is mounted, as shown in FIG. 4. The notch 32 in the notched cylinder 30 is configured to complete the cylindrical opening 36 of the extension 34. It will be noted that the location of the lock 28 is not limited to the location depicted in the Figures.

The locking pin 26 is configured to be receivable through the aligned cylindrical openings 36, as shown in FIG. 1. As shown in FIG. 5, the locking pin 26 defines at least one notch 27 which is positioned to align with the notched cylinder 30 of the lock 28. In the preferred embodiment, the locking pin 26 defines a stop 38 at the first end 40 which serves as a handle and to indicate that the locking pin 26 is properly positioned, as shown in FIG. 1.

The hitch lock 10 is employed in the following manner. The locking plates 16 are pivoted to an open position to reveal the mounting ball 14 and the mounting ball 14 engages the trailer hitch ball socket (not shown) of the trailer to be secured. The locking plates 16 are brought together such that the extensions 34 mesh and the cylindrical openings 36 are aligned. The lock 28 is set in an open position. Specifically, the notch 32 of the notched cylinder 30 is directed toward the opposing locking plate 16. The locking pin 26 is inserted into the aligned cylindrical openings 36 with the notched cylinder 30 being in a position to permit the passage of locking pin 26. When the notch 27 of the locking pin 26 is aligned with the lock 28, the locking pin 26 is in the correct position. The lock 28 is activated by rotating the notched cylinder 30 such that a circular portion of the notched cylinder 30 engages the notch 32 of the locking pin 26 thereby locking the pin 26 in place.

From the foregoing description, it will be recognized by those skilled in the art that a trailer hitch lock offering advantages over the prior art has been provided. Specifically, the trailer hitch lock is designed to enclose the end of a trailer hitch and provides a secure locking mechanism.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A trailer hitch lock comprising:

a base plate including a mounting ball mounted thereon;

a set of locking plates each defining a first end and a second end, said first ends of said set of locking plates being pivotably secured to opposing sides of said base plate;

a locking mechanism cooperating with said second ends to secure said second ends together;

wherein each of said second ends of said set of locking plates defines a plurality of spaced extensions, said plurality of spaced extensions of one locking plate alternating with said plurality of spaced extensions of the remaining locking plate, each of said spaced extensions defining a cylindrical opening therethrough, said cylindrical openings being alignable.

2. The trailer hitch lock of claim 1 wherein said locking mechanism includes a locking pin and a lock, said locking pin being receivable through said aligned cylindrical openings, said locking pin and said lock cooperating to securely hold said second ends of said locking plates together.

3. The trailer hitch lock of claim 2 wherein said lock is mounted proximate an extension, said lock defining a rotatable cylinder, said rotatable cylinder defining a first notch, said cylinder extending through a portion of one cylindrical opening, said first notch being configured to complete said one cylindrical opening and permit passage of said locking pin, said locking pin defining a second notch which is positioned to be alignable with said lock, said rotatable cylinder upon being rotated engages said second notch thereby locking said locking pin in position.

4. A trailer hitch lock comprising:

a base plate including a mounting ball mounted thereon;

a set of locking plates each defining a first end and a second end, said first ends of said set of locking plates being pivotably secured to opposing sides of said base plate, each of said second ends of said set of locking plates defining a plurality of spaced extensions, said plurality of spaced extensions of one locking plate alternating with said plurality of spaced extensions of the remaining locking plate, each of said spaced extensions defining a cylindrical opening therethrough, said cylindrical openings being alignable;

a locking mechanism including a locking pin and a lock, said locking pin being receivable through said aligned cylindrical openings, said locking pin and said lock cooperating to securely hold said second ends of said locking plates together.

5. The trailer hitch lock of claim 4 wherein said lock is mounted proximate an extension, said lock defining a rotatable cylinder, said rotatable cylinder defining a first notch, said cylinder extending through a portion of one cylindrical opening, said first notch being configured to complete said one cylindrical opening and permit passage of said locking pin, said locking pin defining a second notch which is positioned to be alignable with said lock, said rotatable cylinder upon being rotated engages said second notch thereby locking said locking pin in position.

* * * * *